(12) United States Patent
Hoeber et al.

(10) Patent No.: US 7,752,557 B2
(45) Date of Patent: Jul. 6, 2010

(54) METHOD AND APPARATUS OF VISUAL REPRESENTATIONS OF SEARCH RESULTS

(75) Inventors: Orland Hoeber, Regina (CA); Xue-Dong Yang, Regina (CA)

(73) Assignee: University of Regina, Regina, Saskatchewan (CA)

( * ) Notice: Subject to any disclaimer, the term of this patent is extended or adjusted under 35 U.S.C. 154(b) by 616 days.

(21) Appl. No.: 11/511,921

(22) Filed: Aug. 29, 2006

(65) Prior Publication Data

US 2008/0071738 A1 Mar. 20, 2008

(51) Int. Cl.
G06F 17/30 (2006.01)

(52) U.S. Cl. .................. 715/761; 707/705; 707/706; 707/713; 707/722; 707/727; 707/729; 707/731; 715/234; 715/235; 715/236; 715/243; 715/760

(58) Field of Classification Search .............. 715/234, 715/235, 236, 243, 730, 731, 744, 760, 761, 715/764

See application file for complete search history.

(56) References Cited

U.S. PATENT DOCUMENTS

| | | | | |
|---|---|---|---|---|
| 5,768,578 | A * | 6/1998 | Kirk et al. ................ | 707/100 |
| 6,038,560 | A * | 3/2000 | Wical ........................ | 707/5 |
| 6,070,176 | A * | 5/2000 | Downs et al. ............. | 715/234 |
| 6,094,648 | A * | 7/2000 | Aalbersberg ............... | 707/3 |
| 6,363,377 | B1 * | 3/2002 | Kravets et al. ............ | 707/4 |
| 6,742,003 | B2 * | 5/2004 | Heckerman et al. ...... | 707/104.1 |
| 6,895,406 | B2 * | 5/2005 | Fables et al. ............. | 707/102 |
| 7,152,064 | B2 * | 12/2006 | Bourdoncle et al. ........ | 707/5 |
| 7,152,065 | B2 * | 12/2006 | Behrens et al. ............ | 707/5 |
| 7,296,021 | B2 * | 11/2007 | Malkin et al. ............. | 707/7 |
| 7,512,623 | B2 * | 3/2009 | Apps et al. ................ | 707/102 |
| 2002/0052894 | A1 * | 5/2002 | Bourdoncle et al. ...... | 707/513 |
| 2002/0107840 | A1 * | 8/2002 | Rishe ....................... | 707/3 |
| 2004/0215599 | A1 * | 10/2004 | Apps et al. ................ | 707/2 |
| 2004/0220944 | A1 * | 11/2004 | Behrens et al. ............ | 707/100 |
| 2005/0234953 | A1 * | 10/2005 | Zhang et al. .............. | 707/101 |
| 2006/0004734 | A1 * | 1/2006 | Malkin et al. ............. | 707/4 |
| 2006/0161535 | A1 * | 7/2006 | Holbrook ................... | 707/3 |

(Continued)

OTHER PUBLICATIONS

Heimonen, Tomi et al, "Visualizing Query Occurence in Search Results Lists," Sep. 19, 2005, IEEE, pp. 877-882 (6 pages).*

(Continued)

*Primary Examiner*—Neveen Abel Jalil
*Assistant Examiner*—Farhan M Syed
(74) *Attorney, Agent, or Firm*—Patterson, Thuente Christensen, Pedersen P.A.

(57) ABSTRACT

A method and system of visually coding search results is provided. Using a search query containing a plurality of search terms, a web search is conducted and a set of search results is obtained. Occurrence frequencies of the search terms in the returned document are tallied and used to formulate a number of occurrence indicators having color shades based on the occurrence frequencies of the search terms. The search results are then displayed in two levels of detail with a first portion of the search results displayed in a first format and a second portion displayed in a second format. The occurrence indicators for the search terms are displayed beside each returned document to indicate to a user the frequency of the search terms in the search results.

22 Claims, 8 Drawing Sheets

U.S. PATENT DOCUMENTS

| | | | |
|---|---|---|---|
| 2006/0167864 A1* | 7/2006 | Bailey et al. | 707/3 |
| 2006/0190444 A1* | 8/2006 | Wesinger et al. | 707/3 |
| 2006/0190459 A1* | 8/2006 | Wesinger et al. | 707/10 |
| 2006/0224583 A1* | 10/2006 | Fikes et al. | 707/6 |
| 2006/0242129 A1* | 10/2006 | Libes et al. | 707/3 |
| 2006/0242131 A1* | 10/2006 | Okabe et al. | 707/3 |
| 2007/0011151 A1* | 1/2007 | Hagar et al. | 707/4 |

OTHER PUBLICATIONS

Andrews, Keith et al, "Search Result Visualisation with xFind," Jun. 1, 2001, IEEE, pp. 50-58 (9 pages).*

Hoeber, Orland and Yang, Xue Dong, "Interactive Web Information Retrieval Using WordBars," 2006, IEEE, pp. 1-8.*

Granitzer, et al., "WebRat: Supporting Agile Knowledge Retrival through Dynamic, Incremental Clustering and Automatic Labelling of Web Search Result Set," Proceedings of the 12th IEEE International Workshop on Enabling Technologies: Infrastructure for Collaborative Enterprises, Jun. 9-11, 2003, pp. 296-301.*

Hoeber, et al., "Visualization support for interactive query refinement," Sep. 19-22, 2005, 2005 IEEE/WIC/ACM International Conference on Web Intelligence, IEEE, pp. 657-665.*

Pu, Hsiao-Tieh, "A comparative analysis of web image and textual queries," 2005, Emerald Group Publishing Ltd., vol. 29, Issue 5, pp. 457-467.*

* cited by examiner

METHOD AND APPARATUS OF VISUAL REPRESENTATIONS OF SEARCH RESULTS

This invention is in the field of search techniques used by search engines and more specifically methods and systems for displaying the results of searches,

BACKGROUND

The World Wide Web has given computer users on the internet access to vast amounts of information in the form of billions of Web pages. Each of these pages can be accessed directly by a user typing the URL (universal resource locator) of a web page into a web browser on the user's computer, but often a person is more likely to access a website by finding it with the use of a search engine. A search engine allows a user to input a search query made up of words or terms that a user than will be used in the web pages containing the information he or she is looking for. The search engine will attempt to match web pages to the search terms in the search query and will then return the located web pages to the user.

The search results generated from a user's search query typically consist of a collection of document surrogates, each of which contains summary information, attributes, and other meta-data about the matched documents. These document surrogates are often present in a simple list-based format, displaying the title of the document, a snippet containing the query terms in context, and the uniform resource locator (the URL). A user can then select one of the returned entries to view the corresponding web page.

With the continued growth Of web pages available on the internet making the task of search engines more and more difficult, web search engines have greatly increased the size of their indexes and made significant advances in the algorithms used to match a user's search query to these indexes. However, while it is clear that significant effort has gone into creating web search engines that can index billion of documents and return the search results in a fraction of a second, this has resulted in the creation of the problem of search queries returning more results than the user can easily consider.

While many relevant documents might be present in the search results returned from a search engine, often the returned search results consist of tens or hundreds of individual documents making it hard for a user to determine which of the search results may or may not be relevant to the information the user is looking for.

While information retrieval techniques used by web search engines have improved substantially over the years, the search results are still typically represented in a simple list-based format. Although this list-based representation makes it easy to evaluate a single document, it does not support the users in the broader tasks of manipulating the search results, comparing documents, or finding a set of relevant documents. Even though this simple list-based representation provides the search results in a clear and effective manner for determining the relevance of individual document surrogates, it requires that each document surrogate be evaluated in turn, and to some degree, in the order provided. If hundreds of documents are returned, it is inefficient if not completely impractical to have a user review all of these results to determine the most relevant documents located in the search. Requiring users to evaluate each document surrogate individually, often with only ten documents per page, leads to a common user search trait of evaluating only a few pages of search results before either re-formulating their query or giving up.

One solution that can be used to address these numerous search results is for the user to reformulate his or her search query to narrow the search with the result that fewer documents are located matching the search query. However, studies have shown that users seldom reformulate their queries, even when a poor set of search results are provided. In many cases there may be high quality relevant documents buried in the search results set that were missed because the users did not look at enough search result pages.

SUMMARY OF THE INVENTION

It is an object of the present invention to provide an improved method and apparatus that overcomes problems in the prior art.

In a fist aspect of the present invention, a method of visually coding search results is provided. The method comprises: using a search query containing a plurality of search terms to conduct a search of a plurality of computer readable documents and obtain search results containing a list of returned documents; for each returned document in the list, determining an occurrence frequency of a first search term in the returned document and formulating an occurrence indicator having a color shade based on the occurrence frequency for the first search term; and displaying a first portion of the list in a first format on a display screen, and simultaneously displaying a second portion of the list in a second format on the display screen, wherein the occurrence indicator for the first search term is displayed beside each returned document in the first format and second format. The number of returned documents displayed in the first portion is greater than the number of returned documents displayed in the second portion In a second aspect of the present invention, a data processing system for visually coding search results is provided. The data processing system comprises: at least one processor; a memory operatively coupled to the at least one processor; a display device operative to display data; and a program module stored in the memory and operative for providing instructions to the at least one processor, the at least one processor responsive to the instructions of the program module. The program module is operative for: using a search query containing a plurality of search terms to request a search of a plurality of computer readable documents and obtain search results containing a list of returned documents; for each turned document in the list, determining an occurrence frequency of a first search term in the returned document and formulating an occurrence indicator having a color shade based on the occurrence frequency for the first search term; and displaying a first portion of the list in a first format on the display screen, and simultaneously displaying a second portion of the list in a second format on the display screen, wherein the occurrence indicator for the first search term is displayed beside each returned document in the first format and second format. The number of returned documents displayed in the first portion is greater than the number of returned documents displayed in the second portion.

In a third aspect of the present invention, a data processing system product comprises a computer useable medium including a computer readable program for visually coding search results. The computer readable program when executed on a data processing system causes the data processing system to: use a search query containing a plurality of search terms to request a search of a plurality of computer readable documents and obtain search results containing a list of returned documents; for each returned document in the list, determine an occurrence frequency of a first search term in the returned document and formulating an occurrence indicator having a color shade based on the occurrence frequency for the first search term; and display a first portion of the list in a first format on a display screen, and simultaneously display a second portion of the list in a second format on the display screen, wherein the occurrence indicator for the first search term is displayed beside each returned document in the first format and second format. The number of returned documents displayed in the first portion is greater than the number of returned documents displayed in the second portions

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

The present invention provides a compact visual representation of a set of search results at two levels of detail and supports the interactive exploration of web search results. Returned documents, typically in the form of document surrogates, are retrieved from a search engine for a given search query and presented to a user using a visual representation that provides two levels of detail. A number of frequency occurrence indicators are associate with each displayed returned document to indicate to a user the potential relevance of each displayed returned document.

Data Processing System

Figure 1:
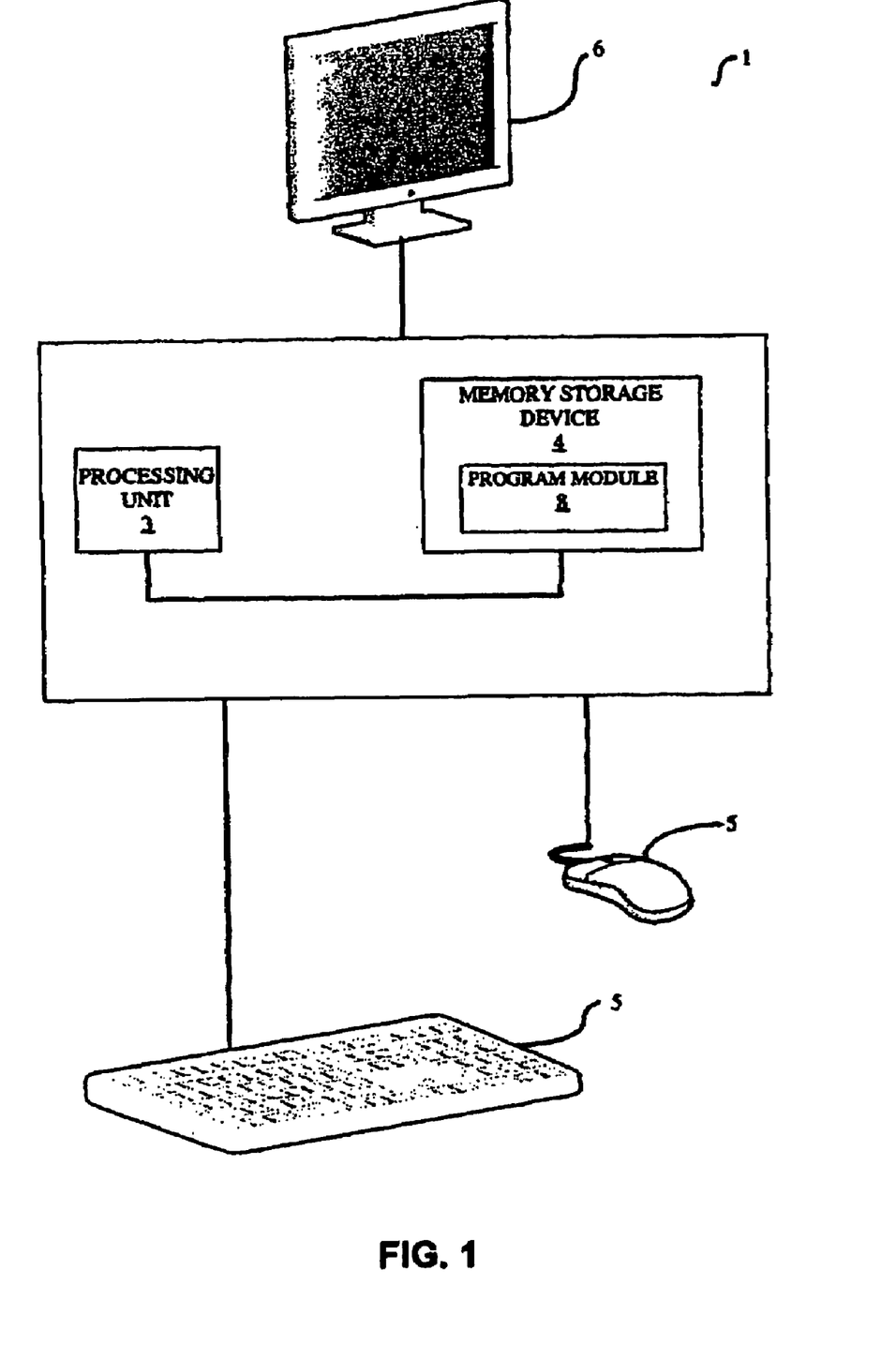
FIG. 1 is schematic illustration of a conventional data processing system capable of implementing the method of the present invention.

FIG. 1 illustrates a data processing system 1 suitable for supporting the operation of methods in accordance with the present invention. The data processing system 1 could be a personal computer, server, mobile computing device, cell phone, etc. The data processing system 1 typically comprises: at least one processing unit 3; a memory storage device 4; at least one input device 5; a display device 6 and a program module 8.

The processing unit 3 can be any processor that is typically known in the art with the capacity to run the provided methods and is operatively coupled to the memory storage device 4 through a system bus. In some circumstances the data processing system 1 may contain more than one processing unit 3. The memory storage device 4 is operative to store data and can be any storage device that is known in the art, such as a local hard-disk, etc. and can include local memory employed during actual execution of the program code, bulk storage, and cache memories for providing temporary storage. Additionally, the memory storage device 4 can be a database that is external to the data processing system 1 but operatively coupled to the data processing system 1. The input device 5 can be any suitable device suitable for inputting data into the data processing system 1, such as a keyboard, mouse or data port such as a network connection and is operatively coupled to the processing unit 3 and operative to allow the processing unit 3 to receive information from the input device 5. The display device 6 is a CRT, LCD monitor, etc. operatively coupled to the data processing system 1 and operative to display information. The display device 6 could be a stand-alone screen or if the data processing system 1 is a mobile device, the display device 6 could be integrated into a casing containing the processing unit 3 and the memory storage device 4. The program module 8 is stored in the memory storage device 4 and operative to provide instructions to processing unit 3 and the processing unit 3 is responsive to the instructions from the program module 8.

Although other internal components of the data processing system 1 are not illustrated, it will be understood by those of ordinary skill in the art that only the components of the data processing system 1 necessary for an understanding of the present invention are illustrated and that many more components and interconnections between them are well known and can be used.

Figure 2A:
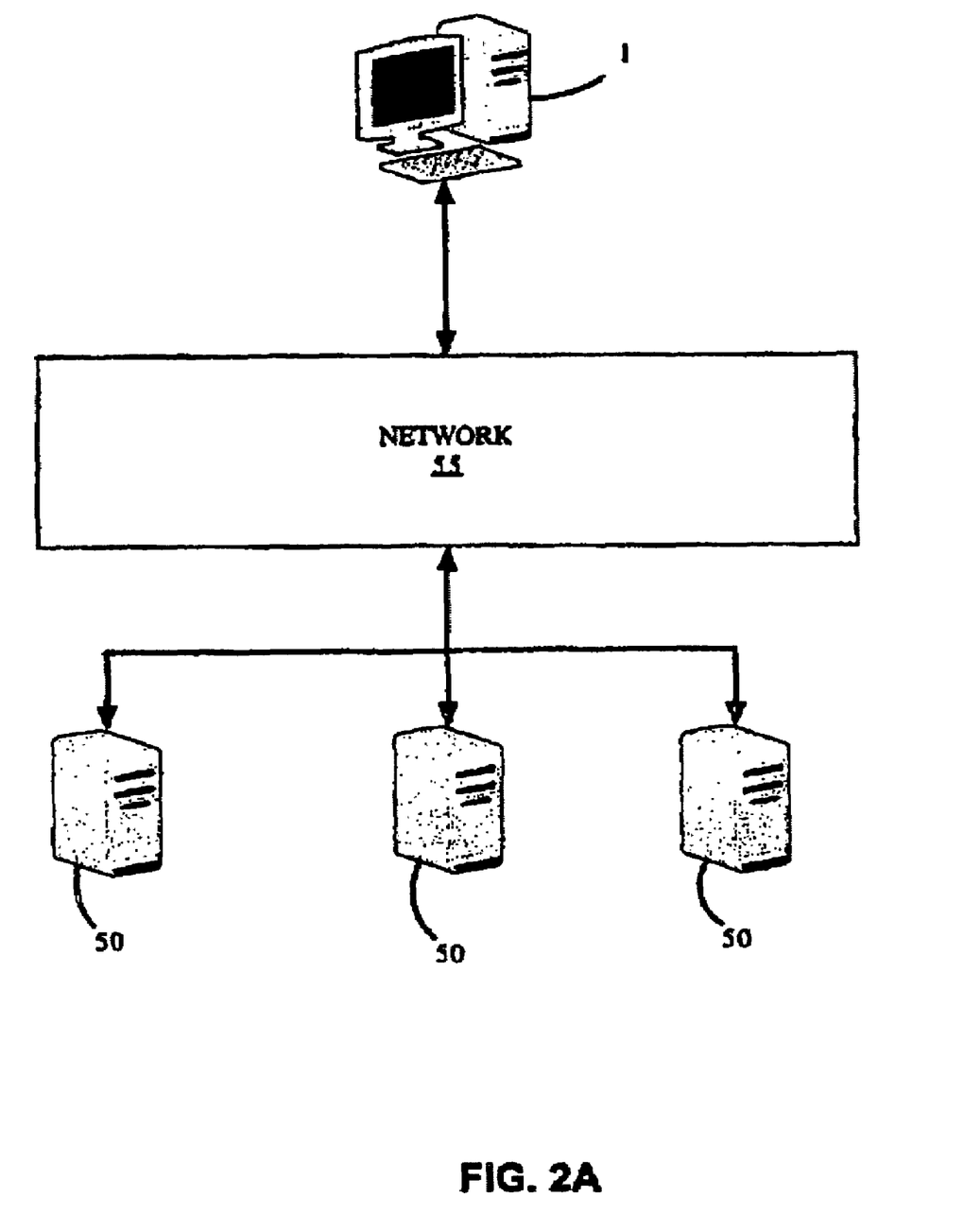
FIG. 2A is schematic illustration of a network configuration wherein a data processing system operative to implement the provided method in accordance with the present invention is connected over a network to a plurality of servers operating as a search engine.
Figure 2B:
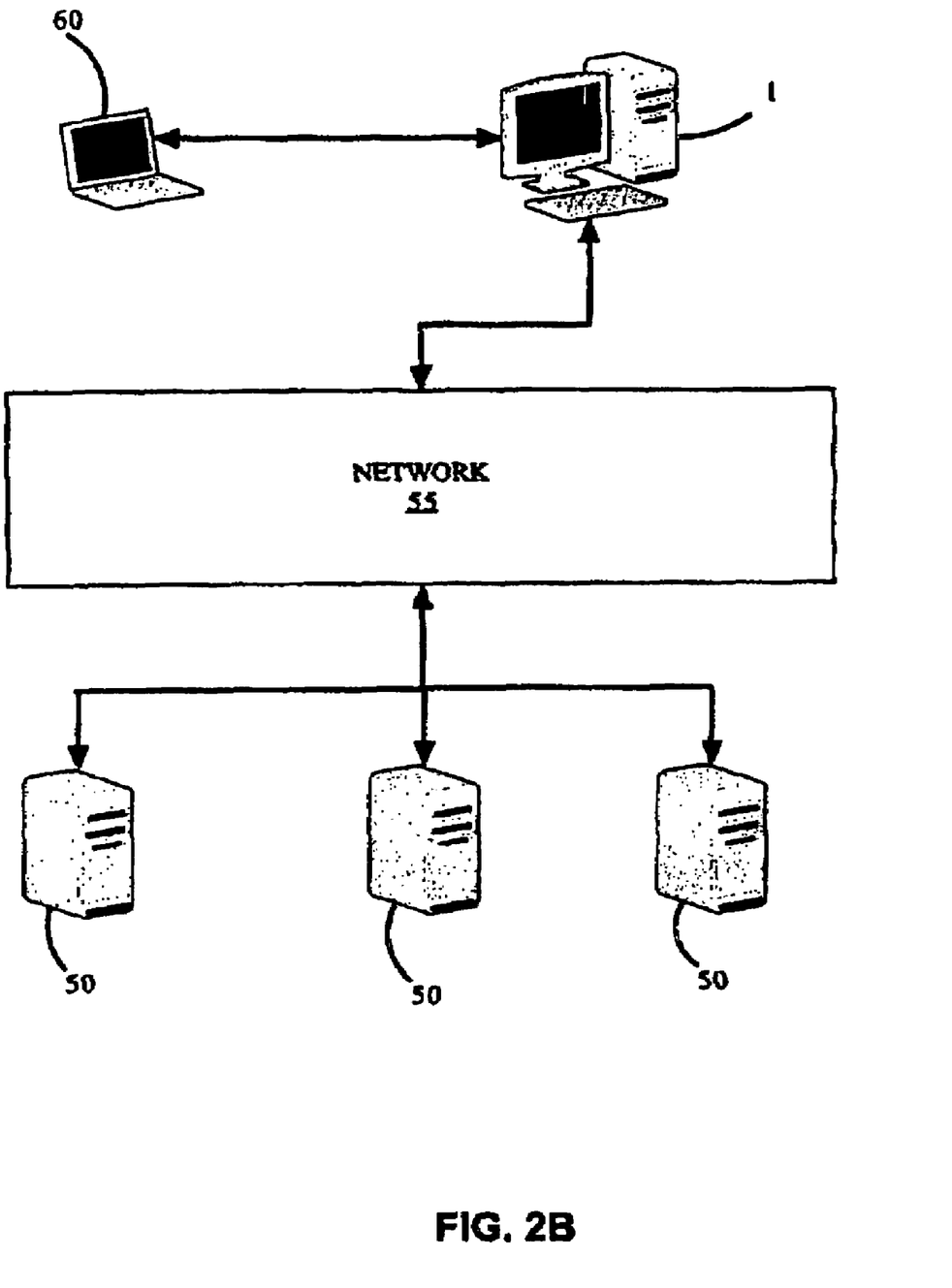
FIG. 2B is a schematic illustration of a network configuration wherein a data processing system is configured as a server and a remote device is used to access the data processing system.

FIG. 2A illustrates a network configuration wherein the data processing system 1 is connected over a network 55 to a plurality of servers 50 operating as a search engine. FIG. 2B illustrates a network configuration wherein the data processing system 1 is configured as a server and a remote device 60, such as another computer, a PDA, cell phone or other mobile device connected to the Internet, is used to access the data processing system 1. The data processing system 1 runs the majority of the software and methods, in accordance with the present invention, and accesses a plurality of severs 50 operating as a search engine to conduct a web search. By having the data processing system 1 configured as a server, the remote client system 60 does not need to have the capacity necessary to contain all the necessary data structures and run all the methods.

Furthermore, the invention can take the form of a computer readable medium having recorded thereon statements and instructions for execution by a data processing system 1. For the purposes of this description, a computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk Current examples of optical disks include compact disk-read only memory (CD-ROM), compact disk-read/write (CD-R/W) and DVD.

Overview of System

Figure 3:
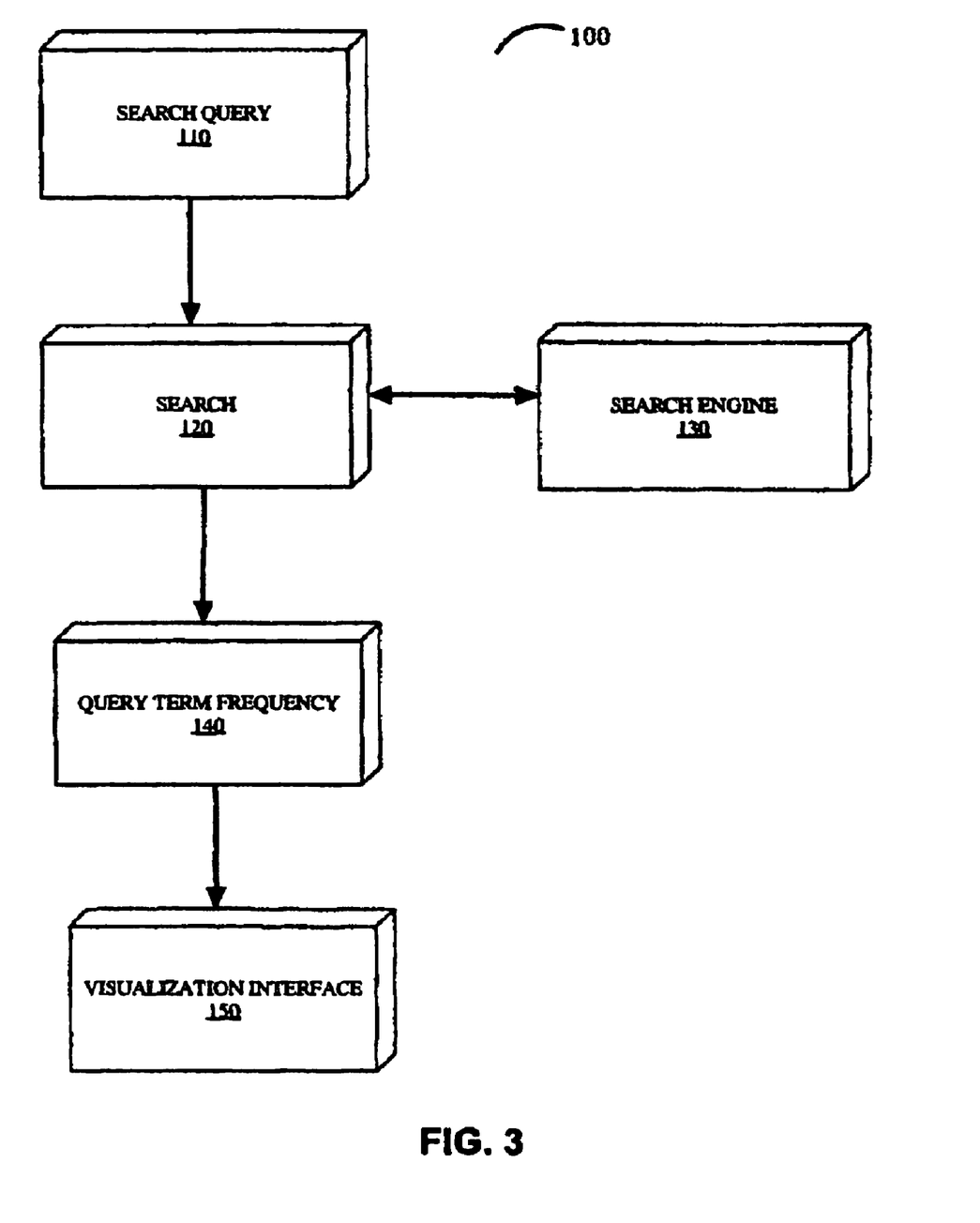
FIG. 3 is a schematic illustration of a software system in accordance with the present invention.

FIG. 3 illustrates a software system in accordance with the present invention. The software system 100 contains: a search query module 110; a search module 120; a search engine module 130; a query term frequency module 140; and a visualization interface module 150.

A search query is input to the system 100 at the search query module 110. The search query contains one or more search teams and usually at least two or three search terms. From the search query module 110 this search query containing one or more search terms is passed to the search module 120, which requests a search engine module 130 to return the results of a search using the search query. Typically, the results returned by the search engine module 130 are a list of returned documents where each returned document is typically a document surrogate that describes the actual documents located by the search engine module 130.

When the results of the search are received from the search engine module 130, the search results and the search query are then passed from the search module 120 to the query term frequency module 140, where the occurrence frequency of each query term in the search query is determined for each of the documents returned in the search results.

Once the occurrence frequency of the search terms is added to each returned document in the search results, the search results are passed to the visualization interface module 150 where the search results are displayed to the user.

The software system 100 can be implemented wholly on a data processing system 1, as shown in FIG. 2A, with only the search engine module 130 resident on a server 50 connected to the data processing system 1 over the network 55. Alternatively, various components of the software system 100 could be resident on a mobile device 60 operably connected to a data processing system 100 which contains other components of the software system 100, as shown in FIG. 2B. For example, the search query module 110 and visualization interface 150 could be resident of the mobile device 60 with the search module 120 and the query term frequency module 140 resident on the data processing system 1 and the search engine module 130 resident on one of the servers 50 operably connected by the network 55 to the data processing system 1.

Search Module

When the search query module 110 passes the search query to the search module 120, the search module 120 requests the search engine module 130 to conduct a search using the search query. The search module 120 is typically resident on the data processing system 1 and the search engine module 130 is typically a web search engine, such as the web search engine running on servers 50 in FIGS. 2A and 2B, with the search being conducted on a number of computer readable documents, such as searching for web pages on the World Wide Web. However, the search engine module 130 could be used in any computerized document storage system capable of searching a large number of computer readable documents.

The search engine module 130 could return the results of the search in the form of a list of complete documents where each complete document contains the majority of the contents of a located document, however, due to the likelihood that a relatively large number of documents can be located with the search and to save overhead on the data processing system, the search results are typically returned in the form of list of returned document where each returned document is a document surrogate, with a document surrogate returned for each document located as a results of search.

Figure 4:
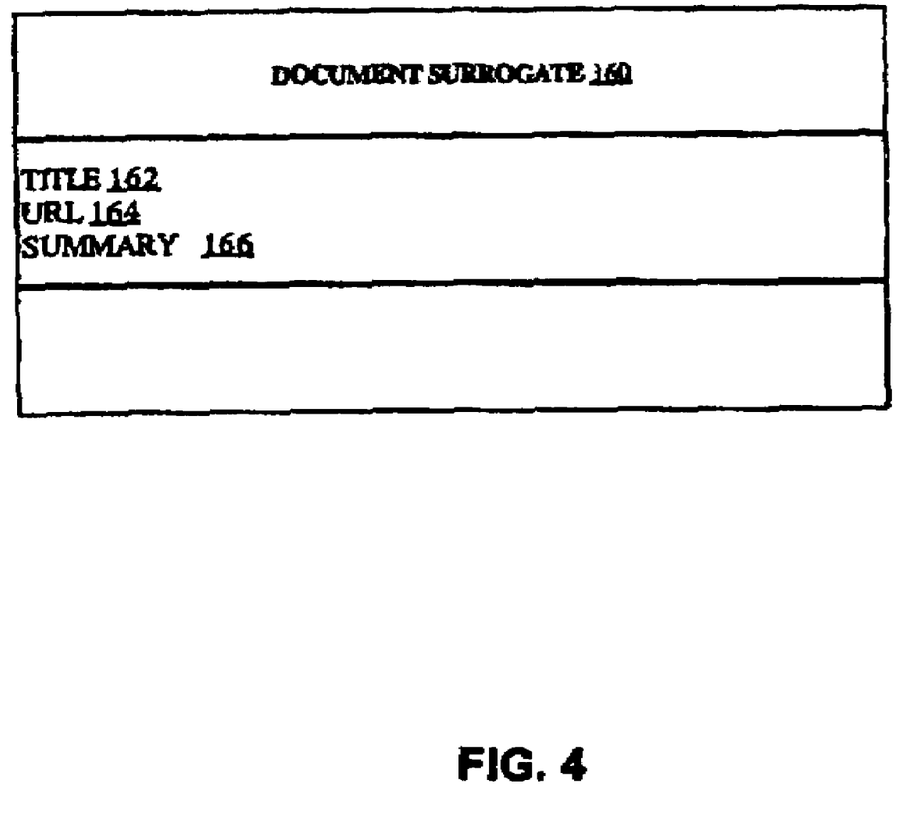
FIG. 4 is a schematic illustration of a document surrogate data object, which is typically provided as a returned document by a search engine as one of a set of search results.

FIG. 4 illustrates a typical document surrogate data object 160 which is commonly provided as a returned document by a search engine as one of a set of search results. Rater than a search engine returning a document containing a complete textual copy of each located document that is located in a search, search engines typically provide a set of document surrogates 160 in place of supplying the completed documents. Document surrogates 160 are the primary data objects in the list-based representation used by search engines. Each document surrogate 160 provides information describing the corresponding complete document which commonly consists of: a title 162; a URL 164; a summary 166; and any other additional other assorted information. The title 162 provides the title of the corresponding complete document described by the document surrogate 160, the URL 164 provides the address of the complete document and the summary 166 contains a short description or snippet of the complete document and usually provides the query terms of the search term in context.

The search results obtained by the search module 120 are passed to the query term frequency module 140 where the occurrence frequency of query terms in the search query are determined for each of the returned documents in the search results.

Query Term Frequency

In the query term frequency module 140, the search results returned by the search engine module 130 are augmented by adding additional attributes to each returned documents in the list of returned documents, beyond the information provided by the search engine module 130. For example, the returned documents provided by the search engine module 130 are typically in the form provided by the document surrogate data object 160 illustrated in FIG. 4. Each of the returned documents are analyzed to determine an occurrence frequency for one or more of the search terms (typically each search term in the search query) and adds the occurrence frequency of each search term to the returned document as an additional attribute.

Figure 5:
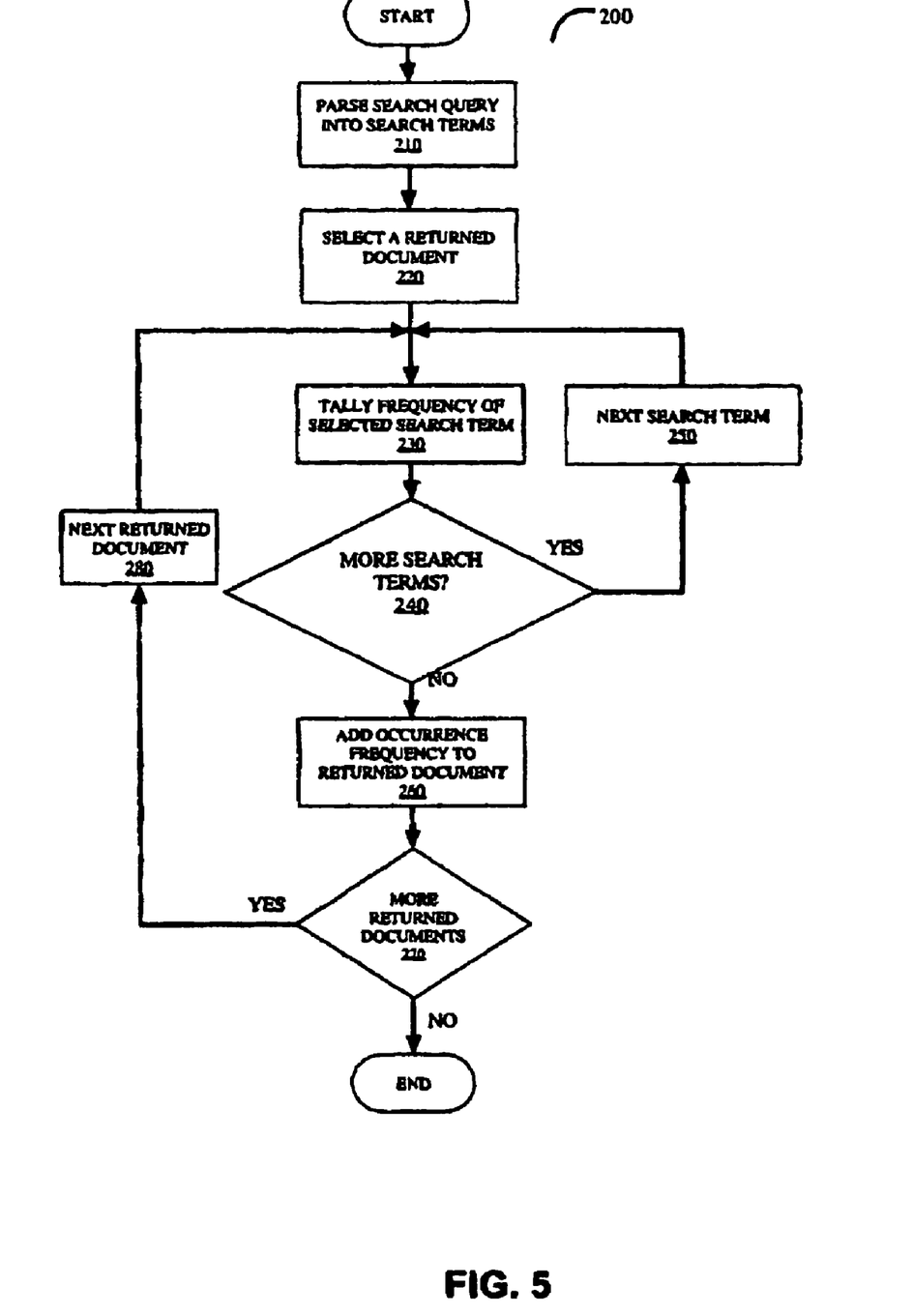
FIG. 5 is a flowchart illustrating a method of associating additional attributes with a returned document, in a accordance with the present invention.

FIG. 5 is a flowchart of a method 200 for determining the occurrence frequencies of search terms in the search query for each of the returned documents and adding the occurrence frequency as an additional attribute to the returned document. The method 200 comprises the steps of: parsing the search query into query terms 210; selecting a returned document 220; tallying the occurrence frequency of a search term in a returned document 230; checking if more search terms must be tallied 240; if more search terms must be checked, moving to the next sea term to be tallied 250; adding the occurrence frequencies of the search term as attributes to the returned document 260; checking if there are more returned documents to be analyzed 270; and, if there are returned documents remaining to be analyzed, moving to the next document to be analyzed 280.

The method 200 begins with the search query consisting of a number of search terms and the returned documents from a search conducted using the search query. At step 210, the search query is parsed into the individual search terms that make up the search query.

At step 220, a first document returned in the search results is selected to be analyzed.

A tally of the frequency of a first selected search term is determined in the first document, at step 230. A count of the occurrence of the search term is conducted. If the document contains the entire textual contents of the document located in the search, the occurrence of the search term in the entire document is conducted. Otherwise, the occurrence of the search term can be determined based on the summary of the complete document and optionally in the title.

Typically, the stems and/or roots of each of the words in the document are matched to the stems or roots of the search terms so that the tally of the search terms does not exclude the use of words that use different suffixes, prefixes, etc. Matching based on the stems or roots of the search terms can be more effective than exact word matches, since it takes into account different variations of the same root word.

At step 240, the method 200 checks to determine whether there are any more search terms to be analyzed in the selected returned document. If there are more search terms to be analyzed for the selected returned document, the next search term is selected at step 250 and step 230 is repeated, deeming the occurrence frequency of the next selected search term.

Steps 230, 240 and 250 are repeated until each search term in the search query has been used to determine the occurrence frequency of each of the search terms in the selected returned document.

At step 260, these occurrence frequencies for each of the search terms are added as an additional attribute to the selected returned document to form a modified returned document. For a given search query consisting of n search terms, the set of attributes $\{q_1, q_2, \ldots, q_n\}$, wherein $q_x$ is the occurrence frequency of a search term, is added to the selected returned document.

The method 200 then checks to see if there are any more returned documents to be analyzed at step 270, and if there are more returned documents remaining, the next returned document is selected at step 280 and steps 230, 240, 250, 260 are repeated for the next returned document to deter the occurrence frequency of each of the search terms in the next returned document and add the occurrence frequencies as additional attributes to the next ret document Once all of the returned documents have been analyzed and the occurrence frequency of each of the search terms is determined for each of the returned documents and added as additional attributes of the returned documents to create a modified ret document, the method 200 ends.

In this manner, the method 200 analyzes each returned document in the list of returned documents provided as the search results to determine the occurrence frequency of each of the search terms in each of the returned documents and adds these occurrence frequencies to the returned documents as additional attributes creating a modified returned document.

Figure 6:
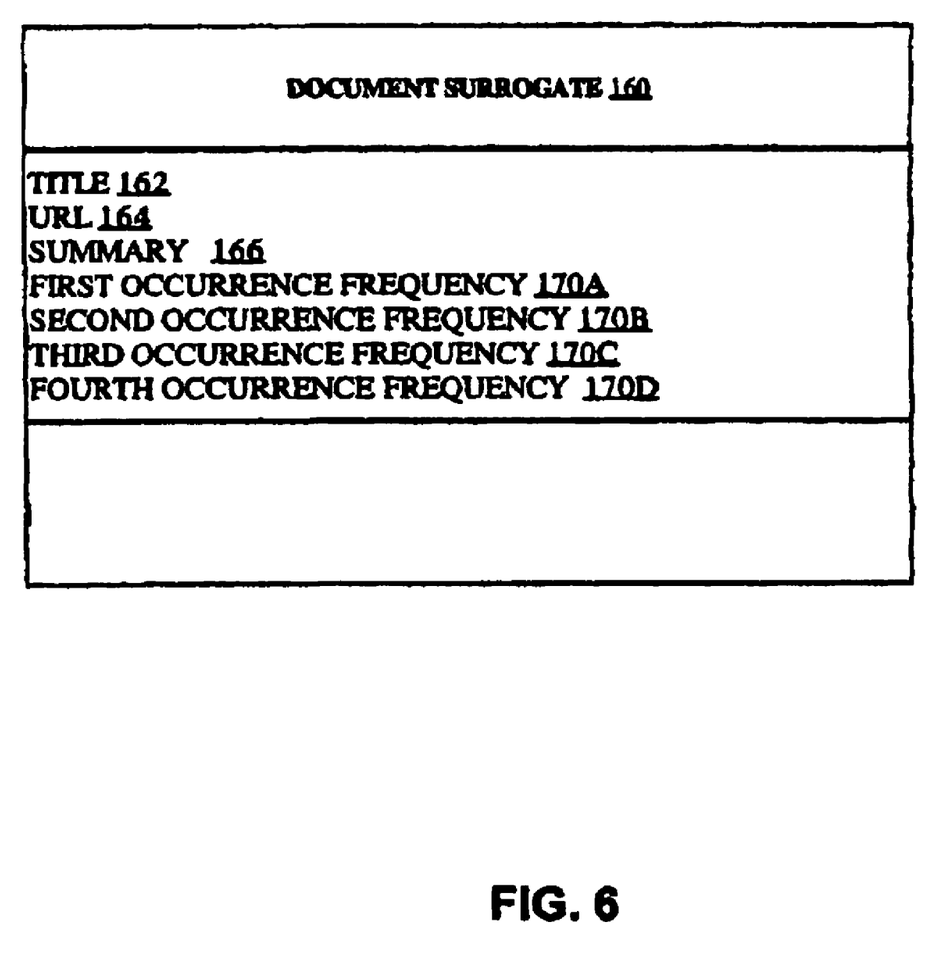
FIG. 6 is a schematic illustration of a document surrogate data object, which as been modified by the method illustrated in FIG. 5.

FIG. 6 illustrates a modified returned document in the form of a modified document surrogate data object 260. The modified document surrogate data object 260 has additional attributes added; specifically, the occurrence frequencies of each of four search terms in the summary 166 of the document surrogate data object 260. Along with the title 162, URL 164 and summary 166, the modified document surrogate data object 160 also contains a first occurrence frequency 170A of a first search term, a second occurrence frequency 170B of a second term, a third occurrence frequency 170C of a third search term and a fourth occurrence frequency 170D. Although FIG. 6 illustrates a modified document surrogate data object 260 with four search terms, a person skilled in the art will appreciated that any number of search terms can be used with the occurrence frequencies of all the search terms added to a modified document surrogate data object so that the modified document surrogate data object contains occurrence frequency attributes for each of the more than four search terms.

The modified returned documents, with the occurrence frequency of each of the search terms of the search query added as additional attributes, are then passed from the search module 120 to the visualization interface module 150.

Visualization Interface

The visualization interface module 150 displays the search results using visual representations at two levels of detail. A compressed level of detail provides the user with an overview of a large number of the search results and a more detailed level of view provides more detailed information about a smaller number of the search results.

Figure 7:
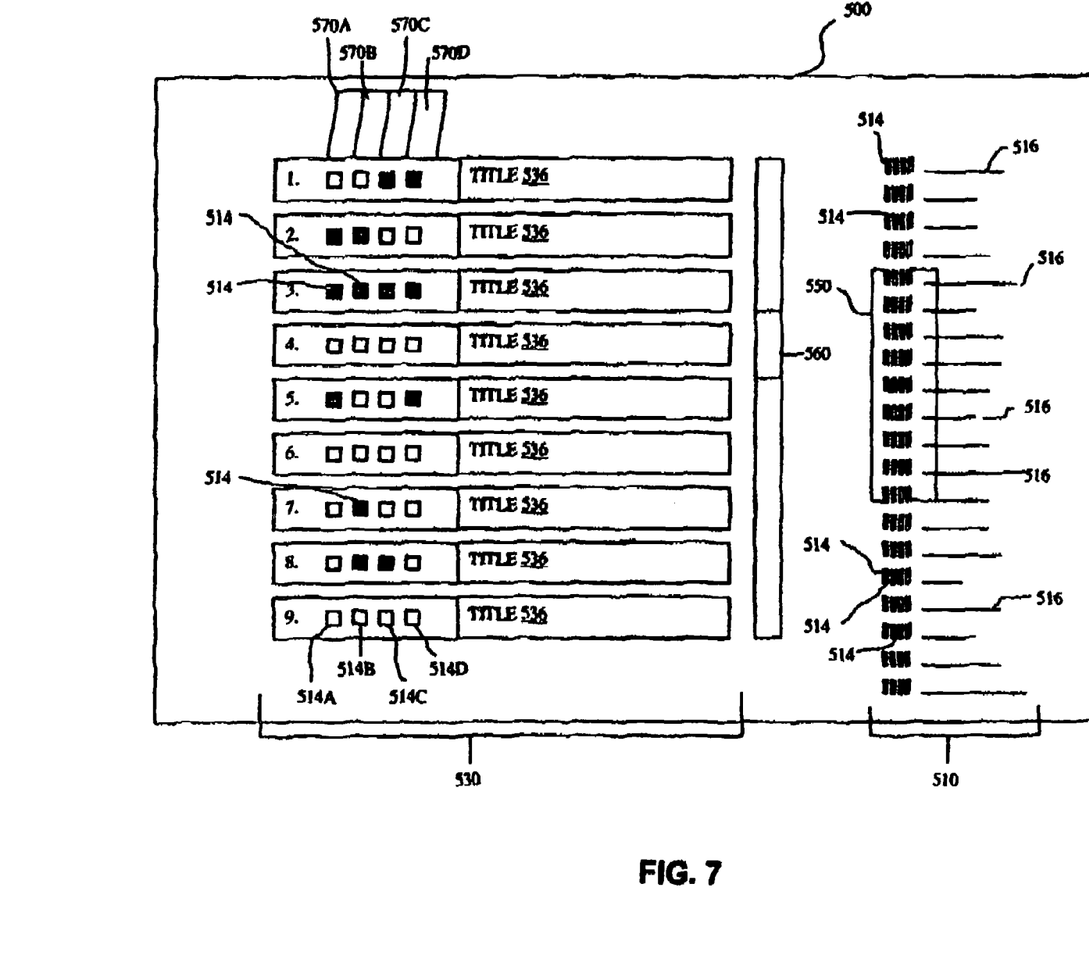
FIG. 7 is a screenshot of a user interface in accordance with the present invention.

FIG. 7 illustrates a screen shot of an exemplary interface 500. The search results in the form of a list of returned documents is passed to the visualization interface module 150 and a first portion 510 of the list of returned documents is displayed in a first format, simultaneously with a second portion 530 of the list of returned documents in a second format, so that the interface 500 provides two levels of detail to a user about returned documents provided in the list returned as the search results. The first portion 510 represents a subset of the documents returned by the search engine and the second portion 530 represents a subset of the returned documents represented by the first portion 510. The first format allows a user to see a large number of the returned documents in a compressed view in the fist portion 510 and then also see a number of the returned documents shown in the first portion 510 in a larger, more detailed view in the second format in the second portion 530.

The first portion 510 displays a number of the returned documents in the list in the first format which provides a compressed or small view of the returned document. Each returned document shown in the first format in the first portion 510 is displayed with a number of occurrence indicators 514, and, typically, a title representation 516. Typically, there is an occurrence indicator 514 corresponding to each search term in the search query. FIG. 7 illustrates search results obtained by using a search query with four search terms and therefore a first occurrence indicator 514A, a second occurrence indicator 514B, a third occurrence indicator 514C and a fourth occurrence indicator 514D are displayed with each returned document in the first portion 510 and second portion 530, an occurrence indictor corresponding to each of the four search terms.

The title representation 516 represents the title of the returned document. However, the title representation 516 does not necessarily have to provide the title in a readable format. Returned documents displayed in the fit format may be displayed so small that a solid line is used to provide the title representation 516 and the title representation 516 merely indicates the approximate length of the title of the returned document in relation to the length of the titles of the other returned documents.

The second portion 530 displays a number of the returned documents in a second format. Each of the returned documents displayed in the second format in the second portion 530 corresponds to a returned document displayed in the first portion 510, such that all of the returned documents in the second portion 530 are contained in the first portion 510, with the returned documents in the second portion 530 occurring in the same order that they occur in the first portion 510.

The second portion 530 shown in the second format provides a much larger and more detailed view of returned documents than the first portion 510 of returned document shown in the first format. Typically, each returned document shown in the second format contains a number of occurrence indicators 514 and a title 536. Typically, each returned document shown in the first format contains an occurrence indicator 514 for each of the search terms. The title 536 provides readable text showing the title of the returned document. The title 536 is typically a hyperlink to the actual document, such as the webpage located in a web search, or a direct link to the document in a traditional information retrieval system.

The second format can display the summary of each returned document. Alternatively, the second format can show the summary of the returned document only when a user moves a cursor over the returned document in the second format. When the user moves a cursor over the returned document in the second portion 530, a popup field (tool tip) can appear containing the summary of the returned document.

The occurrence indicators 514 shown with the returned documents in the fist format and second format are displayed such that a user can identify which occurrence indictors 514 are associated with which search terms. In the interface 500 in FIG. 7, each search term of a search query is displayed as a column title 570 and the column located below the column title 570 holds the occurrence indicators 514 corresponding to that search term. The occurrence indicators 514 in the second portion 530 are positioned under the respective search term indicated in the column title 570 to which they relate. For instance, if the first occurrence indicator 514A indicates the occurrence of the first search term in a returned the occurrence indicator 514A is positioned in the column with the column title 570A indicating the first search term The occurrence indicators 514 displayed with the returned documents in the first portion 510 displayed in the first format occur in the same order as the occurrence indicators 514 displayed with the returned documents in the second portion 530 displayed in the second format.

The additional attributes determined for each returned document, using method 200, illustrated in FIG. 5, indicating the occurrence frequency of search terms in the returned documents, are used to formulate the occurrence indicators 514. A color shade is assigned to each occurrence indictor 514 based on the occurrence frequency determined for the specific search term in the returned document. Typically, search terms that occur more frequently in a returned document (and therefore have a higher occurrence frequency than other search terms) are assigned a color shade that is more intense or rich. For example, a search term that appears few if any times in a document surrogate may be associated with an occurrence indicator 514 that has a color shade of very pale yellow, while a search term diet appears more frequently in a document surrogate will be associated with an occurrence indicator 514 that has a color shade of a much darker red.

The first portion 510 displays a much greater portion of the list of returned documents than the second portion 530. In some cases, more than one hundred (100) returned documents may be displayed in the first portion 510 in the first format. On the other hand the second portion 530 displays a relatively smaller number of the returned documents in the second format because the second format provides more details and therefore the returned documents must be shown in a large enough size that a user can read the titles 536 of the returned documents shown in the second format. For example, while the first portion 510 may display one hundred (100) returned documents in the first format the second portion 530 may display fewer than twenty five (25) returned documents in the second format The use of a color shade in the occurrence indicators 514 allows the information to be conveyed to the user even though the returned document in the first portion 510 may be displayed too small for a user to either easily read or even be able to read text shown in the first format. In some embodiments, rather than the returned documents in the fist format containing a title of the returned document, the title of the returned document is represented by a title representation 516 which is a line simple indicating the relative length of the title of the returned document. Because a color shade is used for the occurrence indicators 514, the occurrence indicators 514 do not have be very large in order to convey the necessary information to a user, just large enough to convey to a user a shade of color. While numbers, text or geometric shapes cannot be illustrated using a single pixel; a color shade can be. In some cases, the occurrence indicator 514 may be made as small as a single pixel of a display screen (depending on the resolution of the display screen and limited to a user's ability to perceive a single pixel on the display screen). Especially for occurrence indicators 514 displayed with returned documents shown in the first format.

An indicator frame 550 is positioned over the returned documents in the first portion 510 that are also shown in the second portion 530. The indicator frame 550 indicates the returned documents shown in the first format in the first portion 510 that are also shown in the second format in the second portion 530.

When a user makes a selection that changes the returned documents shown in the second format in the second portion 530, such as by using a scroll bar 550 to scroll to a new set of returned documents displayed in the second portion 530, the first portion 510 is updated to indicate the same returned documents shown in the second portion 530 in the first portion 510, by moving the indicator frame 550 along the first portion 510.

In this manner, a user can quickly look over the occurrence indicators 514 for each returned document shown in the first format in the first portion 510 and each returned document shown in the second format in the second format 530 and see which returned documents have search terms occurring more frequently than other returned documents without requiring the user to perform any in-depth analysis of each returned document. By simply scanning over the occurrence indictors 514 a user can quickly and easily visually locate the occurrence indicators 514 that indicate a returned document that contains a high occurrence frequency of a specific search term by the various shades of color shown in the occurrence indicators 514.

A user can also visually analyze the returned documents shown in the first format in the first portion 510, checking for returned documents that contain occurrence indicators 514 indicating that a specific search term has a high occurrence frequency in the represented returned document. Once a user identifies a returned or a grouping of returned documents in the first portion 510 that the user wishes to examine in more detail, the user can then move the indicator frame 550 so that the selected returned documents or grouping of returned documents in the first portion 510 are displayed in the second format in the second portion 530. A user can then examine the titles 536 of the represented documents and click on a desired returned document title 536 to go to the document.

Interactivity

A user can sort the list of the returned documents based on one search term over the other by selecting one of the search terms to sort the list by. In one embodiment, a user selects the column title 570 corresponding with the desired search term to select the search term to sort by. The list of returned documents is then resorted to place a precedent on the selected search term and the first portion 510 of returned documents of the first list and the second portion 530 of the returned documents in the second format are updated to reflect the newly sorted list.

A user can also conduct a nested sort by selecting a second search term. The list of returned documents is then resorted to place a primary weight on the first selected search term and then a secondary weight with on the second search term and the first portion 510 of returned documents of the first list and the second portion 530 of the returned documents in the second format are updated to reflect the newly sorted list The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fail within the scope of the claimed invention.

What is claimed is:

1. A data processing system for visually coding search results, the data processing system comprising:
   a display device to display data;
   at least one processor; and
   a memory coupled to the at least one processor storing computer readable instructions executable by the at least one processor, the computer readable instructions when executed by the at least one processor configuring the data processing system to provide:
   i. a visualization interface module processing a result list of a plurality of modified document surrogates, each of the modified document surrogates comprising a document surrogate returned from a search engine in response to a search query, and an indication of a frequency of occurrence of at least one query term of the search query in the document surrogate, the visualization interface module processing the result list to provide display information to display the result list on the display device, the display information providing:
      (1) a main portion for displaying a subset of the result list in a first format, the first format displays for each modified document surrogate in the subset of the result list:
         (a) a title of the modified document surrogate, the title displayed as a readable hyperlink; and
         (b) a visual indication of the frequency of occurrence of the at least one query term, the visual indication based on the indication of the frequency of occurrence of the at least one query term in the modified document surrogate; and
      (2) a compressed portion for displaying a compressed view of the result list, including the subset of the result list displayed in the main portion, in a second format, the second format displays for each modified document surrogate in the result list:
         (c) a representation of the title of the modified document surrogate corresponding to the length and display of the readable hyperlink of the title of the modified document surrogate displayed in the first format; and
         (d) a compressed visual indication of the frequency of occurrence of the at least one query term, the compressed visual indication comprising a color shade corresponding to the visual indication of the frequency of occurrence of the at least one query term displayed in the main portion;
   wherein the compressed portion further for displaying an indicator frame around the compressed view of the subset of the result list displayed in the main portion and wherein the visualization interface module further updates the subset of the result set displayed in the main portion when the indicator frame is repositioned.

2. The data processing system as claimed in claim 1, wherein the representation of the title in the second format is a line corresponding to the length of the title in the first format.

3. The data processing system as claimed in claim 1, wherein the first format further displays for each modified document surrogate in the subset of the result list a summary of the modified document surrogate.

4. The data processing system as claimed in claim 3, wherein the summary is displayed when a user moves a cursor over the displayed modified document surrogate.

5. The data processing system as claimed in claim 1, the search query comprises multiple query terms, and each modified document surrogate in the result list comprises an indication of a frequency of occurrence of each query term of the search query in the document surrogate.

6. The data processing system as claimed in claim 5, wherein the visual indication of the frequency of occurrence of the at least one query term in the first format comprises a visual indication of the frequency of occurrence of each of the query terms, and compressed visual indication of the frequency of occurrence of the at least one query term in the second format comprises a compressed visual indication of the frequency of occurrence of each of the query terms.

7. The data processing system as claimed in claim 6, wherein the visual indication of the frequency of occurrence of each of the query terms in the first format are arranged in columns adjacent the title of the modified document surrogate with the corresponding query term as a heading of each column, and the compressed visual indication of the frequency of occurrence of each of the query terms in the second format are arranged in columns adjacent the representation of the title of the modified document surrogate.

8. The data processing system as claimed in claim 1, wherein the visualization interface module further processes the result list to reorder the result list based on the frequency of occurrence of one of the query terms of the search query and updates the display information of the compressed and main portions based on the reordered result list.

9. The data processing system as claimed in claim 1, where the visualization interface module further updates the compressed portion to reposition the indicator frame when the subset of the result list displayed in the main portion is changed.

10. A method of visually coding search results implemented in a computer comprising at least one processor for executing computer readable instructions stored in a memory, the method comprising:
    receiving at the computer a result list of a plurality of modified document surrogates, each of the modified document surrogates comprising a document surrogate returned from a search engine in response to a search query, and an indication of a frequency of occurrence of at least one query term of the search query in the document surrogate;
    processing the result list to provide display information to display the result list on a display device, the processing of the result list comprising:
       providing in the display information a main portion to display a subset of the result list in a first format, the first format displays for each modified document surrogate in the subset of the result list:
          a title of the modified document surrogate, the title displayed as a readable hyperlink; and
          a visual indication of the frequency of occurrence of the at least one query term, the visual indication comprising a color shade based on the indication of the frequency of occurrence of the at least one query term in the modified document surrogate;

providing in the display information a compressed portion to display a compressed view of the result list, including the subset of the result list displayed in the main portion, in a second format, the second format displays for each modified document surrogate in the result list:

a representation of the title of the modified document surrogate corresponding to the length and display of the readable hyperlink of the title of the modified document surrogate displayed in the first format; and a compressed visual indication of the frequency of occurrence of the at least one query term, the compressed visual indication comprising a color shade corresponding to the visual indication of the frequency of occurrence of the at least one query term displayed in the main portion;

displaying an indicator frame around the compressed view of the subset of the result list displayed in the main portion; and updating the subset of the result set displayed in the main portion when the indicator frame is repositioned.

11. The method as claimed in claim 10, further comprising displaying the representation of the title in the second format as a line corresponding to the length of the title in the first format.

12. The method as claimed in claim 10, further comprising for each modified document surrogate in the subset of the result list:

displaying in the first format a summary of the modified document surrogate.

13. The method as claimed in claim 12, further comprising displaying the summary when a user moves a cursor over the displayed modified document surrogate.

14. The method as claimed in claim 10, wherein the search query comprises multiple query terms, and each modified document surrogate in the result list comprises an indication of a frequency of occurrence of each query term of the search query in the document surrogate.

15. The method as claimed in claim 14, wherein the visual indication of the frequency of occurrence of the at least one query term in the first format comprises a visual indication of the frequency of occurrence of each of the query terms, and the compressed visual indication of the frequency of occurrence of the at least one query term in the second format comprises a compressed visual indication of the frequency of occurrence of each of the query terms.

16. The method as claimed in claim 15, further comprising:

arranging the visual indication of the frequency of occurrence of each of the query terms in the first format in columns adjacent the title of the modified document surrogate with the corresponding query term as a heading of each column; and arranging the compressed visual indication of the frequency of occurrence of each of the query terms in the second format in columns adjacent the representation of the title of the modified document surrogate.

17. The method as claimed in claim 10, further comprising:

reordering the result list based on the frequency of occurrence of one of the query terms of the search query; and updating the display information of the compressed and main portions based on the reordered result list.

18. The method as claimed in claim 10, further comprising updating the compressed portion to reposition the indicator frame when the subset of the result list displayed in the main portion is changed.

19. A data processing system product comprising a computer useable memory including a computer readable program for visually coding search results, wherein the computer readable program when executed on a data processing system causes the data processing system to:

receive at the computer a result list of a plurality of modified document surrogates, each of the modified document surrogates comprising a document surrogate returned from a search engine in response to a search query, and an indication of a frequency of occurrence of at least one query term of the search query in the document surrogate;

process the result list to provide display information to display the result list on a display device, the processing of the result list comprising:

provide in the display information a main portion to display a subset of the result list in a first format, the first format displays for each modified document surrogate in the subset of the result list:

a title of the modified document surrogate, the title displayed as a readable hyperlink; and a visual indication of the frequency of occurrence of the at least one query term, the visual indication comprising a color shade based on the indication of the frequency of occurrence of the at least one query term in the modified document surrogate; and provide in the display information a compressed portion to display a compressed view of the result list, including the subset of the result list displayed in the main portion, in a second format, the second format displays for each modified document surrogate in the result list:

a representation of the title of the modified document surrogate corresponding to the length and display of the readable hyperlink of the title of the modified document surrogate displayed in the first format; and a compressed visual indication of the frequency of occurrence of the at least one query term, the compressed visual indication comprising a color shade corresponding to the visual indication of the frequency of occurrence of the at least one query term displayed in the main portion, wherein the compressed portion further for displaying an indicator frame around the compressed view of the subset of the result list displayed in the main portion and wherein the visualization interface module further updates the subset of the result set displayed in the main portion when the indicator frame is repositioned.

20. The data processing system product as claimed in claim 19, the search query comprises multiple query terms, and each modified document surrogate in the result list comprises an indication of a frequency of occurrence of each query term of the search query in the document surrogate.

21. The data processing system product as claimed in claim 20, wherein the visual indication of the frequency of occurrence of the at least one query term in the first format comprises a visual indication of the frequency of occurrence of each of the query terms, and compressed visual indication of the frequency of occurrence of the at least one query term in the second format comprises a compressed visual indication of the frequency of occurrence of each of the query terms.

22. The data processing system product as claimed in claim 21, wherein the visual indication of the frequency of occurrence of each of the query terms in the first format are arranged in columns adjacent the title of the modified document surrogate with the corresponding query term as a heading of each column, and the compressed visual indication of the frequency of occurrence of each of the query terms in the second format are arranged in columns adjacent the representation of the title of the modified document surrogate.

* * * * *